United States Patent
Huang

(10) Patent No.: US 7,226,095 B2
(45) Date of Patent: Jun. 5, 2007

(54) SEALING DEVICE

(75) Inventor: Jack Huang, Tainan (TW)

(73) Assignees: ITW Limited, Berkshire (GB); Snowberry Enterprise Co., Ltd. (TW)

( * ) Notice: Subject to any disclaimer, the term of this patent is extended or adjusted under 35 U.S.C. 154(b) by 151 days.

(21) Appl. No.: 10/888,581

(22) Filed: Jul. 12, 2004

(65) Prior Publication Data

US 2005/0023844 A1    Feb. 3, 2005

(30) Foreign Application Priority Data

Jul. 30, 2003    (GB) .................... 0317840.7

(51) Int. Cl.
*E05B 39/02*    (2006.01)

(52) U.S. Cl. ....................... 292/327; 292/323

(58) Field of Classification Search ................ 292/327, 292/307 R, 316, 318, 319, 321, 324, 323, 292/329, 330
See application file for complete search history.

(56) References Cited

U.S. PATENT DOCUMENTS

| 970,529 | A | | 9/1910 | Miller |
|---|---|---|---|---|
| 1,001,878 | A | | 8/1911 | Miller |
| 1,943,988 | A | * | 1/1934 | Peake ......................... 292/330 |
| 2,319,753 | A | * | 5/1943 | Smith et al. ................... 70/50 |
| 3,790,198 | A | * | 2/1974 | Hagen ......................... 292/317 |
| 4,779,911 | A | * | 10/1988 | Wu ............................ 292/318 |
| 5,005,883 | A | * | 4/1991 | Guiler ........................ 292/327 |
| 5,582,447 | A | * | 12/1996 | Leon et al. ............. 292/307 R |
| 6,265,973 | B1 | * | 7/2001 | Brammall et al. ....... 340/568.1 |
| 6,550,829 | B1 | | 4/2003 | Dobson |

FOREIGN PATENT DOCUMENTS

| CN | 2364004 Y | 2/2000 |
|---|---|---|
| RU | 2 060 561 | 5/1996 |
| RU | 2 075 111 | 3/1997 |
| WO | 96/05586 A | 2/1996 |

* cited by examiner

*Primary Examiner*—Gary Estremsky

(57) ABSTRACT

A sealing device includes a body part for irremovably receiving the shank of a bolt. The body has a barrel for receiving the bolt, a resilient clip being provided within the barrel for locating behind a shoulder of the bolt. The clip has a head having a widenable gap formed there-through, the head being attached to legs at either side which locate against the sides and bottom of the interior of the barrel.

10 Claims, 3 Drawing Sheets

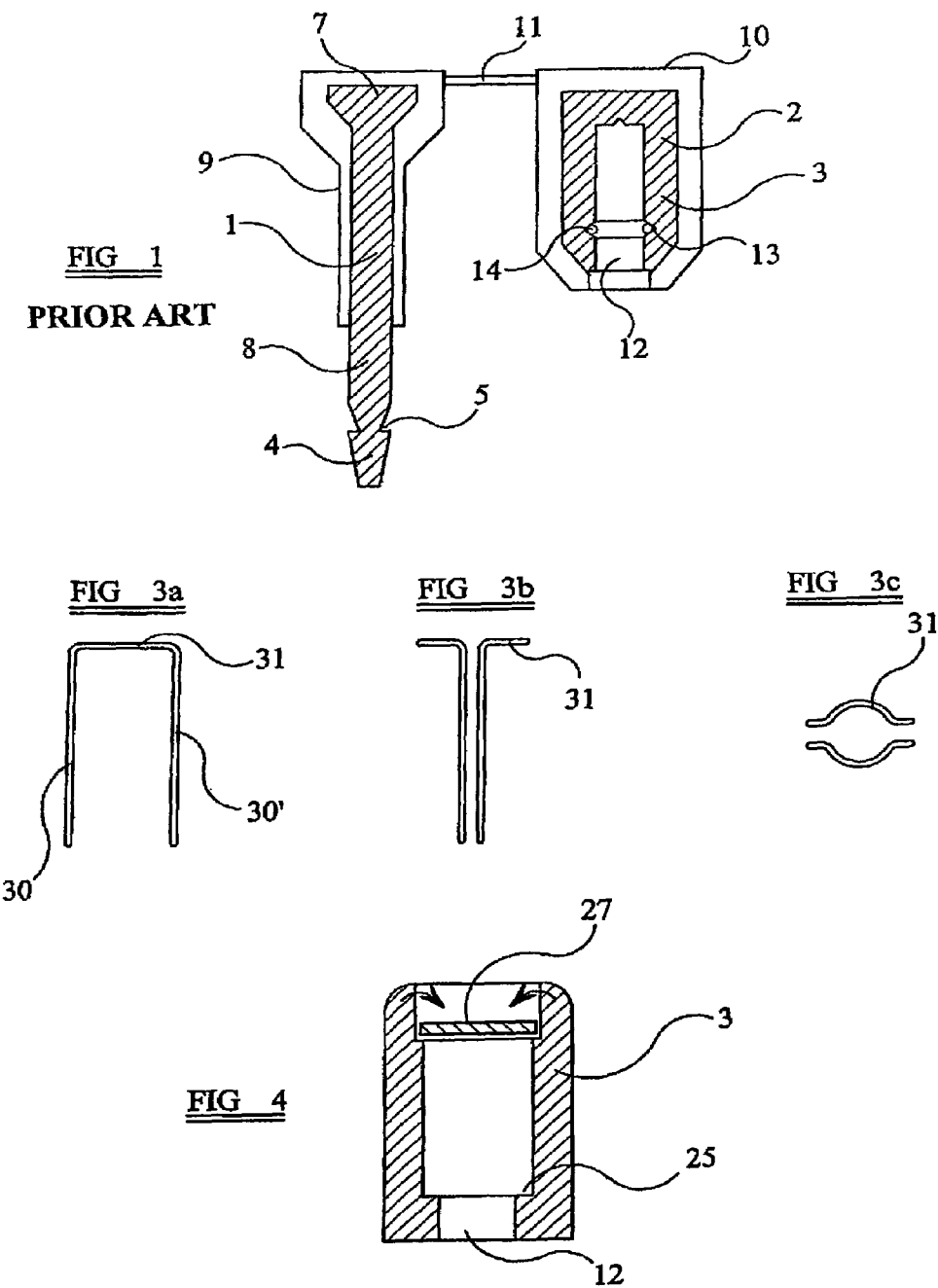

SEALING DEVICE

RELATED APPLICATIONS

The present application is based on, and claims priority from, United Kingdom Application Number 0317840.7, filed Jul. 30, 2003, the disclosure of which is hereby incorporated by reference herein in its entirety.

FIELD OF THE INVENTION

The present invention relates to a sealing or locking device of the type having a main body part into which a bolt is irremovably fitted. Such sealing devices are generally known as bolt seals.

BACKGROUND OF THE INVENTION

Bolt seals are generally used for locking doors or containers, in a similar manner to a padlock (the bolt performing the function of the U-shaped hasp of the padlock). However, unlike a padlock, bolt seals are not intended to be opened by any sort of key. Rather, they are removed by destruction of the seal, in particular by cutting the bolt with a special tool such as a bolt cutter. These bolt seals thus provide a secure locking of a door, in particular the door of a container to be transported by lorry, sea or air. The seals may be provided with a unique serial number, so that they are tamper evident. Although in most seals the bolt is straight, in some situations it is desired that the bolt has a bent or cranked shape

SUMMARY OF THE INVENTION

A conventional bolt seal is illustrated in FIG. 1. The seal includes a bolt (1) and a body part (2), the body part (2) including a metal barrel (3). The bolt (1) has a tapered end (4) behind which is a shoulder (5) forming a narrowed neck (6). At the other end of the bolt is a wider head (7). Typically, the head (7) and a length of the shank (8) of the bolt will be overmoulded by a plastic sleeve (9). Typically the barrel and bolt are both made of steel.

In a similar fashion, the cylindrical metal barrel (3) may be overmoulded with a plastic sleeve (10) and this sleeve itself may be provided with a numbered label and then encased in a transparent plastic material. Conveniently, the bolt (1) and head (2) can be connected by a short strip (11) which is broken when the seal is to be put into use.

The barrel (3) is hollow and includes a mouth (12) for receiving the bolt (1). Spaced from the mouth (12) is an annular groove (13) in which can be located a split steel ring (14). It will be understood that the inner diameter of the barrel is sufficient to receive the shank of the bolt. However, the split ring is sized such that it will, in the relaxed position, locate in the groove (13) but in this condition has an inner diameter which is smaller than the diameter of the shank of the bolt. This can be achieved by the split ring being formed of relatively thick wire, or the split ring being deformed so that it is not quite circular. In any event, the ring is resilient and can be forced to adopt a more open condition upon insertion of the bolt. In particular, the tapered end (4) of the bolt will widen the ring (14), allowing the end of the bolt to pass into the barrel chamber. When the shoulder (5) of the bolt has passed through the ring, the ring will snap back to its relaxed condition around the neck (6) of the bolt. The bolt is thus locked into the barrel by the ring. As already discussed, the seal can now only be opened by destroying the seal, in particular cutting the bolt.

While the above described bolt seal is widely used and is reasonably efficient, it does suffer from some disadvantages. In particular, the positioning of the ring in the groove of the barrel is a difficult and not a wholly reliable mechanical operation. Furthermore, when inserting the ring, it can sometimes occur that the ring is deformed, thus affecting its interaction with the bolt. This can lead to the resistance to insertion of the bolt being so high that the bolt cannot be fitted to the barrel. In general, the prior art bolts seals need a high force to insert the bolt and it is difficult to manufacture the seal with consistent insertion forces.

It is an aim of the invention to provide an improved bolt seal.

According to the invention, there is provided a sealing device of the type comprising a body part for irremovably receiving the shank of a bolt, the body comprising a hollow barrel for receiving the bolt, a resilient clip being provided within the barrel for locating behind a shoulder of the bolt, wherein the clip comprises a head having a widenable gap formed there-through, the head being attached to legs at either side which locate against the sides and bottom of the interior of the barrel.

The invention also provides a method of forming a body part of a sealing device of the type comprising said body part and a bolt which can be irremovably fitted in the body part, the body part comprising a barrel formed of a substantially cylindrical hollow member and a base member, wherein a resilient clip having legs extending longitudinally of the barrel is inserted in one end of the barrel and the base is fixed to that end, the clip in use holding the bolt upon insertion into the barrel.

Preferred embodiments of the invention will now be described in more detail, by example only, with reference to the accompanying figures, wherein:

BRIEF DESCRIPTION OF THE DRAWING

FIG. 1 is a sectional view showing a bolt seal according to the prior art;

FIGS. 2a and 2b are part-sectional perspective views showing a bolt seal according to one embodiment of the present invention, FIG. 2a showing the bolt inserted in the barrel and FIG. 2b being an exploded view of FIG. 2a;

FIGS. 3a, 3b and 3c are views showing the clip of the seal of FIG. 2 in more detail; and FIG. 4 is a sectional detail showing the closing of the barrel of the seal of FIG. 2.

DETAILED DESCRIPTION OF THE INVENTION

Figure 2A:
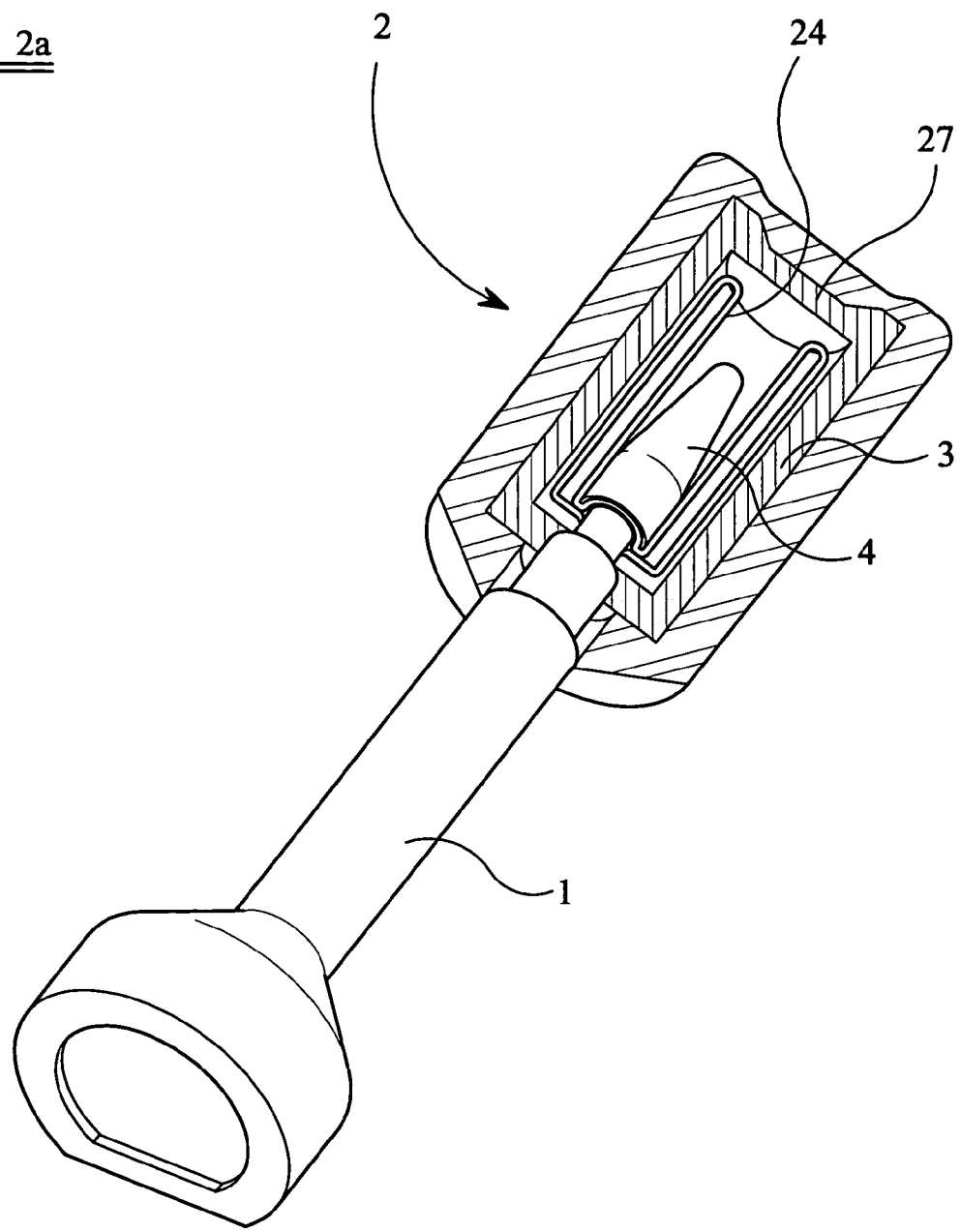

The prior art bolt seal of FIG. 1 has already been described in some detail. In the sealing or locking device of FIG. 2, which shows a bolt seal according to one embodiment of the invention, the same reference numerals as used in FIG. 1 are used again to show corresponding elements.

Figure 2B:
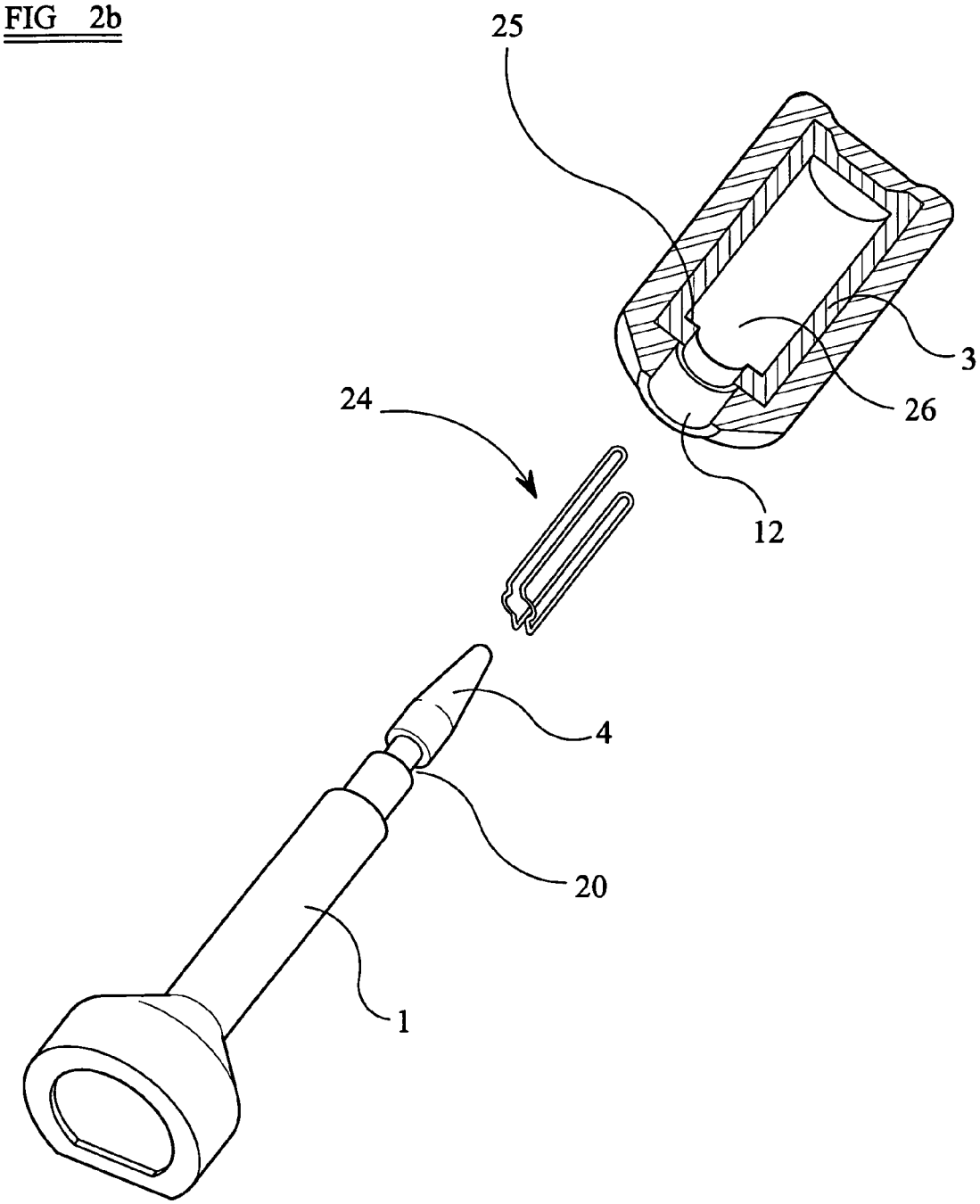

The bolt (1) of FIGS. 2a and 2b is substantially the same as the bolt of the prior art seal. Again, the head and part of the shank are encased in a plastic material (though this is not essential). FIGS. 2a and 2b shows a straight bolt, but again this is not essential. The bolt of FIG. 2 has behind the tapered end (4) a groove (20), this groove being formed by a short narrowed cross-section of the bolt. Also, between the tapered end (4) and the groove (20) is a short section of the shank which is not tapered, this short section having the same cross-section as the remainder of the shank of the bolt.

The main differences between the bolt of the invention and that of the prior art concern the metal barrel (3) and the retaining clip (24) which replaces the split ring (14) of the prior art. The barrel (3) has a narrowed mouth (12) and a wider chamber portion (26). At the junction of the mouth (12) and the chamber portion (26) is an internal shoulder (25) for location of the clip in the barrel. At the end of the chamber portion (26) remote from the mouth (12) there is located a metal disk (27), formed for example of steel. The ends (28) of the barrel are deformed or swaged over the edge of the disk (27) to fix the disk at the base of the barrel. This is further described in relation to FIG. 4 (see below).

Located within the chamber portion (26) is the metal clip (24). As shown in more detail in FIGS. 3a, 3b and 3c, this clip has leg portions (30, 30') joined by a head (31). Head (31) is formed by a pair of spaced wires which close so as to be adjacent to each other at the top of the legs, but form a wider opening in between the legs. As seen in FIG. 3c, the top view of the clip (24) thus shows that the shape is similar to that of an eye. As will be understood from the side view of FIG. 3a, the clip is conveniently formed of one length of wire, the ends of the wire being together at the bottom of one leg and the folded mid-point of the wire forming the end of the other leg. If desired, the clip could be formed of two halves, each with a leg at each side. The clip can be formed of any suitable resilient material, typically a steel or spring steel wire of 0.5 to 1.5 mm diameter, for example 1 mm diameter.

The length of the rounded head (31) of the clip is slightly greater than the diameter of the bolt shank. On the other hand, the width of this rounded head portion is less than the diameter of the bolt shank so that in use the sides of the head of the clip will locate behind the shoulder (5) of the end of the bolt. It will be understood that on insertion of the bolt, the tapered end (4) will push apart the sides of the head (31) of the clip, thus forcing the clip to widen to allow passage of the end (4). However, as soon as the head has passed the clip, the clip will snap into the groove (20) thus fixing the bolt in the chamber.

Although the Figures show that the clip is fixed in the barrel by locating behind an internal shoulder (25), other arrangements are possible. For example, the resilient clip may have outer ears or prongs which would snap into an internal groove of the barrel. However, it is believed that the described shoulder of the barrel will provide the most positive resistance to the bolt being pulled out, after it is captured by the clip.

As will be seen from FIG. 2a, the length of the legs (30, 30') of the clip are chosen so that on fixing of the disk (27) the clip is located in the barrel so that excessive movement of the clip along the length of the barrel is not possible. On the other hand, the clip has to have a degree of looseness so that it can flex apart to allow insertion of the bolt.

The way in which the clip (24) is inserted into the barrel (3) will now be described, with reference to FIG. 4. Before the barrel is overmoulded in plastics material, the end of the barrel (3) remote from the mouth (12) is open. The clip, which has a width substantially the same as the inner diameter of the chamber (26) of the barrel, is pushed in from the end of the barrel, remote from the mouth (12). This is a very simple and reliable operation, with no risk of deformation of the clip. The clip can be pushed into the barrel until the head of the clip is against the internal shoulder (25) of the barrel or the ends of the legs are level with the barrel end. The disk (27) is then inserted into the end of the barrel, preferably seating on an annular shoulder, at a position adjacent the ends of the arms (30, 30') of the clip (although insertion of the disk may push the clip in further, if it is not yet fully inserted).

The ends of the barrel are then deformed or swaged on top of the disk, to fix it in place. The barrel can then be overmoulded in plastic material, in a conventional fashion. It will be understood that in addition to the easy and reliable fitting of the clip into the barrel, the barrel itself can also be formed more easily due to its simplified cross-section as compared to the prior art barrels.

In a less preferred embodiment, the barrel can be formed as in the prior art (FIG. 1) and the clip can be inserted from the top, using a dedicated tool.

The invention can thus provide an improved bolt seal in which a very efficient locking of the bolt into the barrel is achieved through the flexing sides of the head of the clip. The clip can also be fitted in the barrel in a reliable and efficient manner, thus improving the security of the seal and decreasing manufacturing costs. Other advantages of the invention will be apparent to the skilled person. Furthermore, modifications of the embodiment described above will also be apparent to the skilled person and no limitations to the inventive concept should be read into the detailed description above, the invention being defined by the scope of the accompanying claims.

The invention claimed is:

1. A sealing device comprising:
a bolt having a shank, and a shoulder formed on the shank and adjacent an end of the shank; and
a body part for irremovably retaining the shank of said bolt;
the body comprising:
a barrel for receiving the bolt, and
a resilient clip irremovably held within the barrel for locating behind and engaging with the shoulder of the bolt;
wherein
the clip comprises a head and legs connected to the head,
the head defines a gap elastically enlargeable to allow passage of said end of the shank of the bolt therethrough,
the legs extend away from the head so as to locate along sides and at a bottom of an interior of the barrel, and
said head has a rounded shape,
wherein the legs of the clip are formed by parallel wires and the clip is formed of a single length of wire shaped to form the head and legs.

2. A sealing device comprising:
a bolt having a shank, and a shoulder formed on the shank and adjacent an end of the shank; and
a body part for irremovably retaining the shank of said bolt;
the body comprising:
a barrel for receiving the bolt, and
a resilient clip irremovably held within the barrel for locating behind and engaging with the shoulder of the bolt;
wherein
the clip comprises a head and legs connected to the head,
the head defines a gap elastically enlargeable to allow passage of said end of the shank of the bolt therethrough,
the legs extend away from the head so as to locate along sides and at a bottom of an interior of the barrel, and
said head has a rounded shape, wherein the head of the clip locates behind an internal shoulder formed inside of a mouth of the barrel and the clip is formed of a single length of wire shaped to form the head and legs.

3. A sealing device according to claim 2, wherein the legs of the clip are formed by parallel wires.

4. A sealing device according to claim 2, wherein
the head of the clip rests against the internal shoulder in the barrel;
said sides of the interior of the barrel are all parallel to an axial direction of said barrel; and
said internal shoulder projects radially inwardly perpendicular to the axial direction of said barrel.

5. A sealing device, comprising:
a bolt having a shank with opposite first and second ends, an enlarged head at the first end, and a groove formed adjacent the second end to define a shoulder; and
a body for irremovably retaining said bolt;
the body comprising:
a barrel for receiving at least the second end of the shank, and
a resilient clip irremovably held within the barrel for being received in said groove and engaging with the shoulder of the bolt;
wherein
the clip comprises a head and two legs connected to the head;
the head of the clip defines an opening elastically enlargeable to allow passage of said second end of the shank of the bolt therethrough;
the legs extend away from the head of the clip towards a bottom of an interior of the barrel;
said barrel has an aperture opposite said bottom, said aperture being sized for allowing the second end of said shank to pass though and formed by a transverse wall that projects from inner side walls of said barrel radially inwardly;
said head of said clip is located adjacent said aperture and has a dimension greater than said aperture for preventing withdrawal of said clip from the interior of said barrel;
the inner side walls of said barrel are all parallel to an axial direction of said barrel; and
the transverse wall projects from the inner side walls radially inwardly and perpendicular to said axial direction of said barrel, wherein said legs of the clip are parallel.

6. In combination, a bolt and a barrel;
said bolt having a shank and a head, said shank comprising in the order from the head: a first portion, a second portion, a third portion and a distal section;
said first portion extending away from said head and defining a first diameter, said first portion terminating immediately at said second portion having a second diameter less than the first diameter, thereby defining a first radial wall extending towards a central axis of said bolt; and
said third portion located in proximity to said distal section, said third portion defining a second radial wall with the second portion and a shoulder with the distal section, wherein said distal section tapering towards the central axis, and
said barrel comprising:
an internal chamber having a first end and a second end, said first end defining a first opening capable of receiving said distal section of said shank and said second end opposite to the first end defining a second opening adapted to receive a clip; and
an end cap closing the second opening of said barrel;
wherein, said barrel upon receiving the clip is overmoulded by a plastic material, and a third opening corresponding to the first opening and having a diameter greater than the first opening is defined by the overmoulded plastic material and said clip comprises a head and two legs connected to the head,
the head of the clip defines an opening elastically enlargeable to allow passage of said second end of the shank of the bolt therethrough,
the legs extend away from the head of the clip towards the second end of the barrel.

7. In combination, a bolt and a barrel;
said bolt having a shank and a head, said shank comprising in the order from the head: a first portion, a second portion, a third portion and a distal section;
said first portion extending away from said head and defining a first diameter, said first portion terminating immediately at said second portion having a second diameter less than the first diameter, thereby defining a first radial wall extending towards a central axis of said bolt; and
said third portion located in proximity to said distal section, said third portion defining a second radial wall with the second portion and a shoulder with the distal section, wherein said distal section tapering towards the central axis, and
said barrel comprising:
an internal chamber having a first end and a second end, said first end defining a first opening capable of receiving said distal section of said shank and said second end opposite to the first end defining a second opening adapted to receive a clip; and
an end cap closing the second opening of said barrel;
wherein, said barrel upon receiving the clip is overmoulded by a plastic material, and a third opening corresponding to the first opening and having a diameter greater than the first opening is defined by the overmoulded plastic material and the legs of the clip are formed by parallel wires, and said clip is formed of a single length of wire shaped to form the head and legs.

8. A combination of claim 7, wherein said head of the clip comprises first and second curved wire sections which are arranged diametrically opposite to each other, define together a rounded shape of said opening, and connected to both said legs of the clip.

9. A combination of claim 7, wherein in said locked position said first portion is spaced away from said first opening of said barrel and inside the third opening defined by the overmoulded plastic material.

10. In combination, a bolt and a barrel;
said bolt having a shank and a head, said shank comprising in the order from the head: a first portion, a second portion, a third portion and a distal section;
said first portion extending away from said head and defining a first diameter, said first portion terminating immediately at said second portion having a second diameter less than the first diameter, thereby defining a first radial wall extending towards a central axis of said bolt; and
said third portion located in proximity to said distal section, said third portion defining a second radial wall with the second portion and a shoulder with the distal section, wherein said distal section tapering towards the central axis, and said barrel comprising:

an internal chamber having a first end and a second end, said first end defining a first opening capable of receiving said distal section of said shank and said second end opposite to the first end defining a second opening adapted to receive a clip; and an end cap closing the second opening of said barrel;

wherein, said barrel upon receiving the clip is overmoulded by a plastic material, and a third opening corresponding to the first opening and having a diameter greater than the first opening is defined by the overmoulded plastic material and said end cap along with a portion of said overmoulded plastic material covering said end cap is inside the second opening of the second end of said internal chamber.

\* \* \* \* \*